(12) United States Patent
Dolev et al.

(10) Patent No.: US 11,170,094 B2
(45) Date of Patent: Nov. 9, 2021

(54) SYSTEM AND METHOD FOR SECURING A COMMUNICATION CHANNEL

(71) Applicant: SECRET DOUBLE OCTOPUS LTD, Tel-Aviv (IL)

(72) Inventors: Shlomi Dolev, Omer (IL); Shimrit Tzur-David, Mevaseret Zion (IL); Chen Tetelman, Tel Aviv (IL); Amit Lavi, Petah-Tiqva (IL); Amit Rahav, Tel-Aviv (IL); Raz Rafaeli, Kfar Saba (IL)

(73) Assignee: SECRET DOUBLE OCTOPUS LTD., Tel-Aviv (IL)

( * ) Notice: Subject to any disclaimer, the term of this patent is extended or adjusted under 35 U.S.C. 154(b) by 187 days.

(21) Appl. No.: 16/072,190

(22) PCT Filed: Jan. 26, 2017

(86) PCT No.: PCT/IL2017/050099
§ 371 (c)(1),
(2) Date: Jul. 24, 2018

(87) PCT Pub. No.: WO2017/130200
PCT Pub. Date: Aug. 3, 2017

(65) Prior Publication Data
US 2019/0034618 A1  Jan. 31, 2019

Related U.S. Application Data

(60) Provisional application No. 62/287,507, filed on Jan. 27, 2016, provisional application No. 62/287,491, (Continued)

(51) Int. Cl.
*H04L 9/08* (2006.01)
*H04L 29/06* (2006.01)
(Continued)

(52) U.S. Cl.
CPC .......... *G06F 21/44* (2013.01); *G06F 21/606* (2013.01); *H04L 9/0662* (2013.01);
(Continued)

(58) Field of Classification Search
CPC .... G06F 21/44; G06F 21/606; H04W 12/003; H04W 4/70; H04L 63/0435; H04L 63/067;
(Continued)

(56) References Cited

U.S. PATENT DOCUMENTS

2002/0018570 A1* 2/2002 Hansmann ............ H04L 9/3236
380/270
2003/0190046 A1* 10/2003 Kamerman ........... H04L 9/3265
380/286
(Continued)

FOREIGN PATENT DOCUMENTS

WO WO 0245340 6/2002

OTHER PUBLICATIONS

International Search Report of Application No. PCT/IL2017/050099 dated May 24, 2017.

*Primary Examiner* — Michael Pyzocha
(74) *Attorney, Agent, or Firm* — Pearl Cohen Zedek Latzer Baratz LLP

(57) ABSTRACT

A system and method for securing a communication channel may include obtaining a first value by first and second devices. A second value may be randomly selected by the first device and may be provided to the second device. The first and second devices may independently from one another apply a function to the first and second values and may use a result of the function to secure and authenticate a communication channel between the first and second devices.

20 Claims, 7 Drawing Sheets

Related U.S. Application Data filed on Jan. 27, 2016, provisional application No. 62/381,623, filed on Aug. 31, 2016.

(51) Int. Cl.

| | | |
|---|---|---|
| *H04L 9/32* | (2006.01) | |
| *H04L 9/06* | (2006.01) | |
| *H04W 12/50* | (2021.01) | |
| *G06F 21/44* | (2013.01) | |
| *G06F 21/60* | (2013.01) | |
| *H04W 4/70* | (2018.01) | |

(52) U.S. Cl.
CPC .......... *H04L 9/0827* (2013.01); *H04L 9/0844* (2013.01); *H04L 9/3215* (2013.01); *H04L 9/3228* (2013.01); *H04L 63/0435* (2013.01); *H04L 63/067* (2013.01); *H04L 63/0838* (2013.01); *H04L 63/18* (2013.01); *H04W 12/50* (2021.01); *H04W 4/70* (2018.02)

(58) Field of Classification Search
CPC ..... H04L 9/3228; H04L 9/0827; H04L 63/18; H04L 9/0844; H04L 63/0838; H04L 9/3215; H04L 9/0662
See application file for complete search history.

(56) References Cited

U.S. PATENT DOCUMENTS

| | | | | |
|---|---|---|---|---|
| 2005/0177714 | A1* | 8/2005 | Jeong | G11B 20/0021 713/155 |
| 2006/0171540 | A1* | 8/2006 | Lee | H04L 9/0822 380/277 |
| 2007/0189528 | A1* | 8/2007 | Ueda | H04W 12/04 380/44 |
| 2008/0005262 | A1* | 1/2008 | Wurzburg | G06F 13/4022 709/217 |
| 2008/0005562 | A1* | 1/2008 | Sather | H04L 9/3236 713/168 |
| 2008/0141034 | A1* | 6/2008 | Bartram | H04L 9/3239 713/176 |
| 2009/0279518 | A1* | 11/2009 | Falk | H04L 29/12839 370/338 |
| 2010/0042838 | A1* | 2/2010 | Ho | H04L 9/0844 713/169 |
| 2011/0238995 | A1* | 9/2011 | Blanco | H04L 63/0492 713/173 |
| 2012/0272064 | A1* | 10/2012 | Sundaram | H04L 63/0869 713/171 |
| 2014/0013390 | A1 | 1/2014 | Sade et al. | |
| 2014/0323049 | A1* | 10/2014 | Park | H04W 76/10 455/41.2 |
| 2015/0003615 | A1 | 1/2015 | Vanstone et al. | |
| 2016/0099920 | A1* | 4/2016 | Meuleman | H04L 63/18 713/153 |
| 2016/0099922 | A1* | 4/2016 | Dover | G06F 21/575 713/171 |
| 2016/0241403 | A1* | 8/2016 | Lindemann | G06F 21/40 |
| 2017/0006004 | A1* | 1/2017 | Li | H04L 9/3215 |
| 2017/0048218 | A1* | 2/2017 | Lindemann | G06Q 20/40145 |
| 2017/0093811 | A1* | 3/2017 | Dolev | H04L 45/1287 |
| 2017/0277882 | A1* | 9/2017 | Savolainen | H04L 29/06 |
| 2018/0241548 | A1* | 8/2018 | Dolev | H04L 63/0428 |
| 2020/0225673 | A1* | 7/2020 | Ebrahimi Afrouzi | G05D 1/0214 |
| 2020/0275249 | A1* | 8/2020 | Kim | H04W 12/06 |
| 2021/0045125 | A1* | 2/2021 | Mondal | H04W 72/0493 |

* cited by examiner

SYSTEM AND METHOD FOR SECURING A COMMUNICATION CHANNEL

CROSS-REFERENCE TO RELATED APPLICATIONS

This application is a National Phase Application of PCT International Application No. PCT/IL2017/050099, International Filing Date Jan. 26, 2017, entitled "System and Method for Securing a Communication Channel", published on Aug. 3, 2017 as International Patent Publication No. WO 2017/130200, claiming the benefit of U.S. Provisional Patent Application No. 62/287,507, filed Jan. 27, 2016, U.S. Provisional Patent Application No. 62/287,491, filed Jan. 27, 2016 and U.S. Provisional Patent Application No. 62/381,623, filed Aug. 31, 2016, all of which are hereby incorporated by reference.

FIELD OF THE INVENTION

The present invention relates generally to security and authentication. More specifically, the present invention relates to securing a communication channel between computing devices and to authenticating computing devices.

BACKGROUND OF THE INVENTION

Protecting and securing information communicated between computing devices is a requirement that is well acknowledged by the computing industry. As known in the art, an attacker that gains access to sensitive or personal data may cause extreme damage. The need to authenticate devices is critical in enforcing security of information.

Known systems and methods use encryption to secure and protect communicated data and credentials (e.g., user name and password) to authenticate devices or users. However, known systems and methods suffer from a few drawbacks. For example, some systems and methods use a certificate authority that, if hacked, may fail to provide security. Other examples may be a hacker who obtains credentials such as user name and password and can use the credentials to authenticate himself to a computer, device or system, an eavesdropper who manages to obtain an encryption key can decrypt encrypted data, and an adversary or malicious entity who manages to capture one or more decrypted messages may decipher the encrypted messages.

For example, some known systems and methods use a public key infrastructure (PKI) that includes a set of roles and procedures used to create and distribute digital certificates that are used to authenticate, or confirm identities of, parties involved in a communication. Specifically, a registration authority (RA) accepts requests for digital certificates and authenticates entities. Accordingly, PKI based systems and methods do not scale easily since the load on an RA increases as the number of devices in a system grows. For example, known systems and methods are unable to meet challenges introduced by the introduction of Internet of Things (IoT) devices and systems where extremely large numbers of devices need to be authenticated.

Further aggravating the problem associated with known systems and methods is the fact that an RA is a single point of failure. Yet another drawback of known systems and methods such as PKI based systems is that they do not enable two device to authenticate each other without using a third device or entity, for example, in a PKI based system, for two devices to authenticate each other, a third entity (e.g., an RA) must be used.

SUMMARY OF THE INVENTION

In some embodiments, a first value may be obtained by first and second devices. A second value may be randomly selected by the first device and may be provided to the second device. The first and second devices may, independently from one another, apply a function to the first and second values and may use a result of the function to secure and authenticate a communication channel between the first and second devices.

A third value may be generated based on the first and second values, and may be used to define an encryption key, and the encryption key may be used to encrypt data communicated over the communication channel. The second device may be authenticated, by the first device, based on determining that the second device possesses the first and second values.

The first value may be provided the at least the first device over an out-of-band channel, and the second value may be provided over an in-band channel.

A set of two or more values may be randomly selected by at least one of the first and second devices; at least two different routes in a network may be selected, and the set of values may be sent from one of the first and second devices to the other over the at least two different routes, such that no single entity on a network obtains more than a predefined number of values included in the set; and the first value and the set of values may be used, by the first and second devices, to secure the communication channel between the first and second devices.

Obtaining the first value by the first and second devices may include selecting the first value, by the second device, and providing the first value to the first device. The first value may be sent over a first communication channel and the second value may be sent over a second communication channel. The first and second values may be encrypted.

At least one of the first and second values may be sent, from the first device to a third device, over a secured communication channel between the first and third devices; and the third device may be used to provide the at least one of the first and second values to the second device.

The first value may include a first pair of input and output values of a polynomial, and the second value may include a second pair of input and output values of the polynomial. The first and second pairs may be used to identify the polynomial, and the third value may be generated, determined or identified based on a coefficient of the polynomial.

A degree K of a polynomial may be randomly selected. A set of at least K+1 pairs of input and output values of the polynomial may be randomly chosen or generated. The at least K+1 pairs may be provided to the first and second devices over at least two different network routes, such that no single entity on a network obtains more than K+1 pairs included in the set of at least K+1 pairs. After constructing the polynomial from the at least K+1 pairs, one of the first and last coefficients of the polynomial may be used to secure and authenticate the communication channel between the first and second devices.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Some embodiments of the invention are illustrated by way of example and not limitation in the figures of the accompanying drawings, in which like reference numerals indicate corresponding, analogous or similar elements, and in which:

Figure 1:
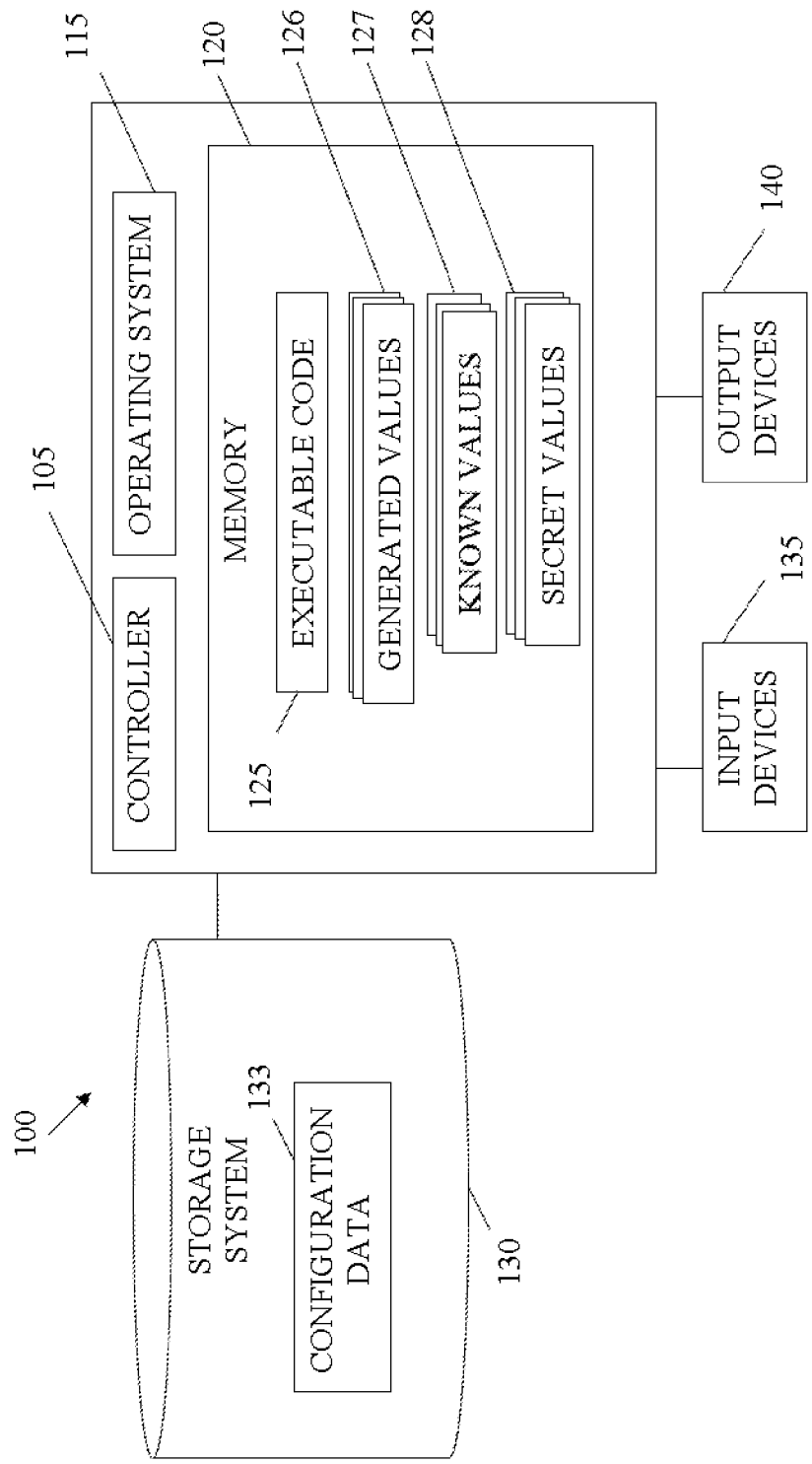
FIG. 1 shows high-level block diagram of a computing device according to illustrative embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although some embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a high-level block diagram of a system or computing device according to some embodiments of the present invention. Computing device 100 may include a controller 105 that may be, for example, a central processing unit processor (CPU), a chip or any suitable computing or computational device, an operating system 115, a memory 120 that may include executable code 125, generated values 126, known values 127 and secret values 128. As shown, computing device 100 may include or be operatively connected to storage system 130, input devices 135 and output devices 140. As shown, storage system 130 may include configuration data 133.

Controller 105 (or one or more controllers or processors, possibly across multiple units or devices) may be configured to carry out methods described herein, and/or to execute or act as the various modules, units, etc. More than one computing device 100 may be included in, and one or more computing devices 100 may be, or act as the components of, a system according to some embodiments of the invention. Controller 105 may be or may include a microprocessor, a microcontroller, a digital signal processor (DSP), a field programmable gate array (FPGA), a programmable logic device (PLD), a state machine, gated logic, discrete hardware components, dedicated hardware finite state machines, or any other suitable hardware.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system, e.g., Windows, Linux, Android and the like.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Each of generated values 126, known values 127 and secret values 128 may be, or may include, a number, a value, a code, a set of numbers or values, a string (e.g., one or more characters, for example, represented using their respective American Standard Code for Information Interchange (ASCII) code or value) or any digital object that includes or represents a value, e.g., an object or memory segment the size of 32, 64 or 128 bits. Known values 127 may be, or may be calculated based on, a value that is known to, or included in, a device, e.g., a serial number embedded in a ROM and printed on the back of a network hub, a value entered by a user, etc.

Any number of known values 127 may be included in a device, module or unit (e.g., in a security enforcement unit as described herein). For example, several known values 127 such as a serial number, the manufacture date and time and/or identification (ID) code of an appliance may be known to, or included in, an appliance (e.g., stored in ROM) and known to, or included in, a user's smartphone (e.g., entered by the user).

Generated values 126 may be, or may include, a value generated and stored, in a device, by a user and/or manufacturer or it may be randomly generated by a device as described herein, e.g., generated values 126 may be randomly selected and/or generated by computing device 100 or it may be randomly selected and/or generated by a remote device and provided to computing device 100. Any number of generated values 126 may be (and typically are) included in a device, module or unit (e.g., in a security enforcement unit as described herein).

For example, one or more generated values 126 may be generated for each new communication channel, or session, between computing device 100 and a remote device or one or more generated values 126 may be generated once per device, e.g., upon a first or initial communication with a remote device and/or during a process of authenticating a remote device. Secret values 128 may be calculated, defined and/or determined based on one or more generated values 126 and/or one or more known values 127.

Randomly generating a value or number as referred to herein may be, or may include, generating a value or number that cannot be reasonably predicted, e.g., as done for lottery games or by a random-number generator (RNG) as known in the art.

Generated values 126, known values 127 and secret values 128 may be complex values, numbers, codes or objects, for example generated values 126 and/or known values 127 may be, may represent or may include, a pair of values that represent a point $(x_i, y_i)$ on a polynomial p(x). For example, using predefined logic or function, a value in a barcode may be used to calculate a set of $(x_i, y_i)$ values and the set may be stored in one or more of known values 127.

Executable code 125 may be any executable code, e.g., an application, a program, a process, task or script. Executable code 125 may be executed by controller 105 possibly under control of operating system 115. For example, executable code 125 may be an application that secures a communication channel and/or authenticates a remote device as further described herein. Embedded in memory 120, executable code 125 may be firmware as known in the art.

Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., security enforcement unit 211 described herein) may be, or may include, controller 105, memory 120 and executable code 125.

Figure 2:
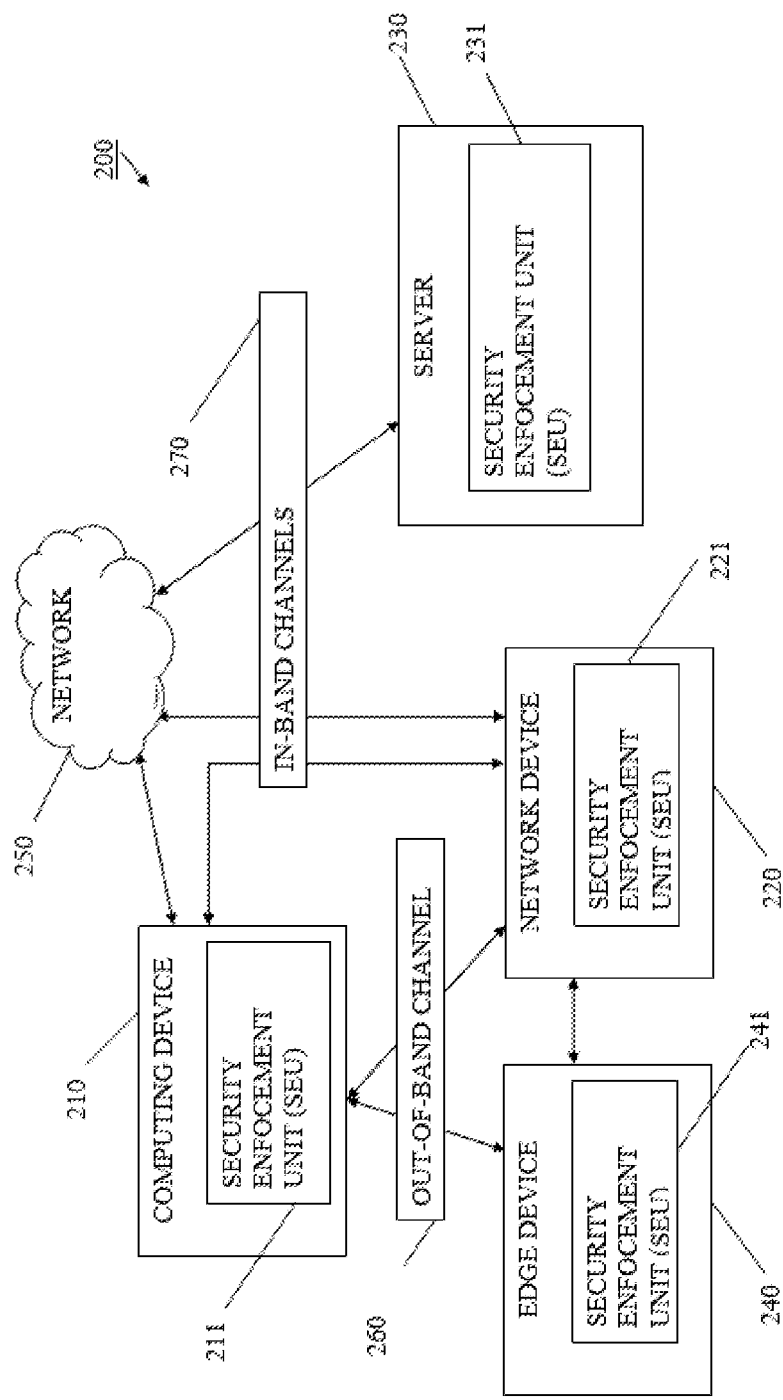
FIG. 2 is an overview of a system according to illustrative embodiments of the present invention.

For example, the components shown in FIG. 2, e.g., security enforcement units 211, 221 and 231 as further described herein may be, or may include components of, computing device 100, e.g., include a controller 105, a memory 120 and executable code 125. For example, by executing executable code 125 stored in memory 120, controller 105, e.g., when included in a security enforcement unit as described, may be configured to carry out a method of enforcing security by for example, executing software or code stored in memory 120. For example, included in a security enforcement unit in a first device, controller 105 may be configured to obtain a first value that may also be obtained by a remote (or second) device; randomly select a second value and send the second value to the remote device; use the first and second values to define a third value; and use the third value to secure a communication channel with the remote (or second) device and/or use the third value to authenticate the remote device.

Storage system 130 may be or may include, for example, a hard disk drive, a Compact Disk (CD) drive, a CD-Recordable (CD-R) drive, a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, included in a network hub, a smartphone, cellular phone, or in a wearable device, memory 120 may be a non-volatile memory or a non-transitory storage medium having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, any one or more of a wired or wireless network interface card (NIC); a WiFi or Bluetooth component or chip; a universal serial bus (USB) device; or an external hard drive may be included in, or connected to computing device 100 by, input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal or laptop computer, a server computer, a network device, a smartphone, smartwatch or other mobile device, an IoT device or object, or any other suitable computing device. An IoT device may include any component or system enabling the IoT device to communicate over a network (e.g., over the internet or over a WiFi or Bluetooth network). For example, an IoT device may be designed or adapted to communicate with remote devices using the internet protocol (IP). Accordingly, a system as described herein may include any number of devices such as computing device 100.

Reference is made to FIG. 2, an overview of a system 200 according to some embodiments of the present invention. As shown, system 200 may include a security enforcement unit (SEU) 211 that may be, or may be included in, computing device 210. Computing device 210 may be, or may include components of, computing device 100. For example, computing device 210 may be a laptop, a server, a smartphone, a smartwatch or another wearable or mobile device and SEU 211 may be or may include: memory 120; executable code 125; and controller 105.

As further shown, system 200 may include a network device 220 that may include an SEU 221, for example, network device 220 may be a network hub, network router or any other device connected to a network. For example, network device 220 may be a device connected to an in-house network, e.g., a local and/or secured WiFi network, a private IP network and the like.

As further shown, system 200 may include edge device 240 that may include an SEU 241, for example, edge device 240 may be an IoT device or any other device connected to a network. Server 230 may be a network server as known in the art and may include an SEU 231 as shown.

Figure 3:
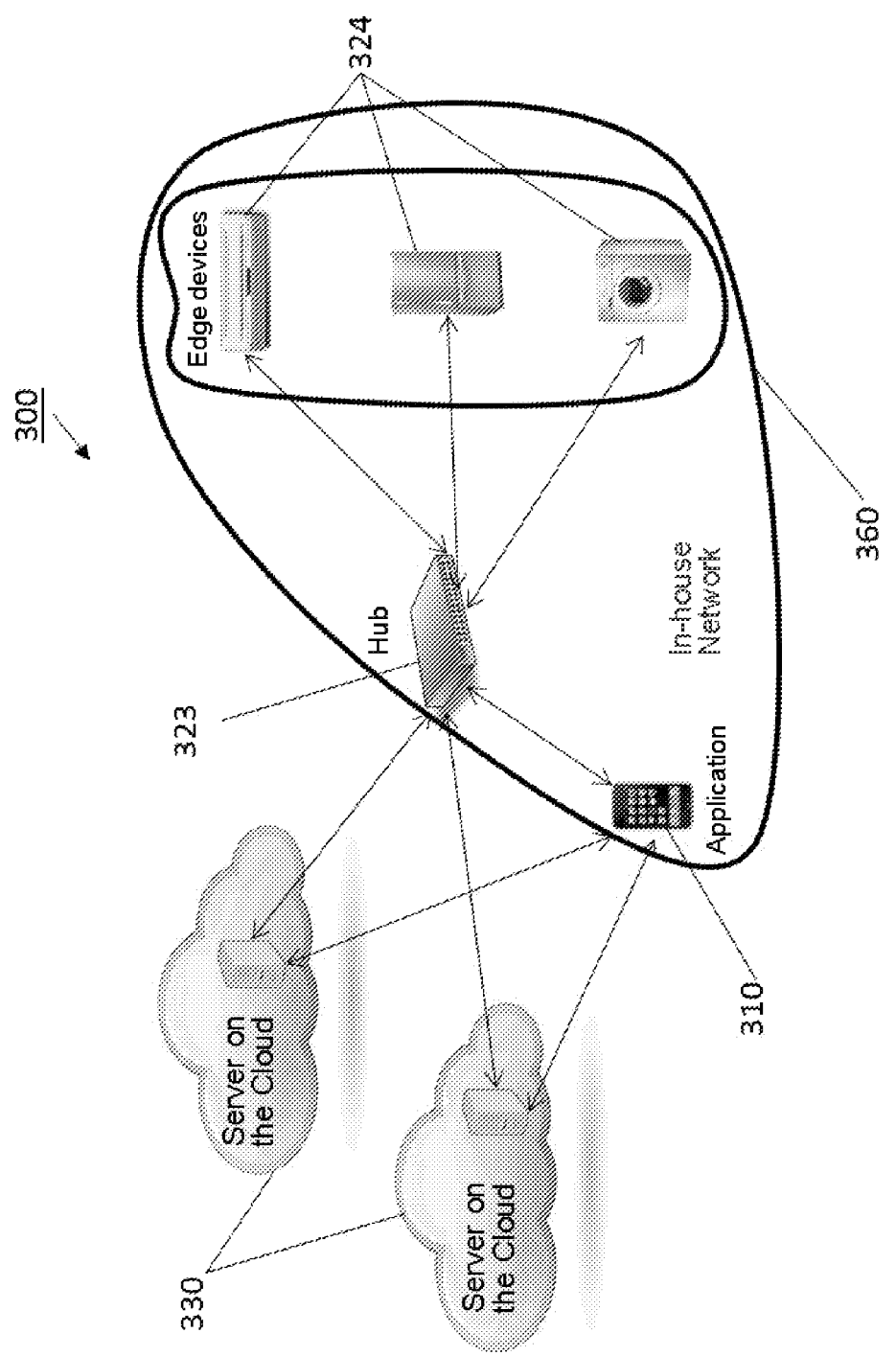
FIG. 3 is an overview of a system according to illustrative embodiments of the present invention.

For the sake of clarity, only one server 230, one computing device 210, one network device 220 and one edge device 240 are shown in FIG. 2, however, it will be understood that any (possibly large) number of servers 230, computing devices 210, network devices 220 and edge devices 240 may be included in system 200. For example, system 200 may include or connect several servers 230 (e.g., as shown in FIG. 3), several computing devices 210 (e.g., a laptop, a smartphone or a server), a plurality of network devices 220, e.g., several network hubs and any number of edge devices 240 such as IoT or other edge devices, e.g., IoT devices or units in a washing machine, a climate control system and an insulin pump. Each of devices 220, 240 and server 230 and/or SEUs 211, 221, 231 and 241 may be, or may include components of, computing device 100 as described with respect to computing device 210, it will therefore be understood that any function, operation or logic performed by one SEU as described herein may be performed by other SEUs.

Each of SEUs 211, 221 and 231 may be, or may include components of, computing device 100, it will be understood that any function, operation or logic performed by one of these SEUs as described herein may be performed by other SEUs.

Network 250 may be, may comprise or may be part of a private or public IP network, or the internet, or a combination thereof. Additionally or alternatively, network 250 may be, comprise or be part of a global system for mobile communications (GSM) network. For example, network 250 may include or comprise an IP network such as the internet, a GSM related network and any equipment for bridging or otherwise connecting such networks as known in the art. In addition, network 250 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 250 are implied but not shown, e.g., access points, base stations, communication satellites, GPS satellites, routers, telephone switches, etc. It will be recognized that embodiments of the invention are not limited by the nature of network 250.

Out-of-band channels 260 may be, or may include, a direct line of sight (e.g., enabling a user to read a code printed on a device), a Short Message Service (SMS) message sent from a trusted person, a push notification or message from a server, a conversational exchange between one or more people, e.g. a verbal conversation, a conversation via telephone, electronic mail (email) and the like. It will be understood that, where applicable, an out-band-channel may be established between any two entities or devices included in an embodiment and that not all possible out-of-band channels are shown in FIG. 2, e.g., although it may be established, an out-of-band channel between computing device 210 and server 230 is not shown.

In-band channels 279 may be, or may include, a network connection or channel, e.g., in-band channels 279 may be one or more of: a Transmission Control Protocol (TCP) connection; a Secure Sockets Layer (SSL) session; or a sequence of User Datagram Protocol (UDP) packets over network 250. For example and as shown, an in-band channel may be established between server 230 and network device 220 or between server 230 and computing device 210 (e.g., over network 250 that may include the internet) and/or between computing device 210 and network device 220, for example, a TCP connection between computing device 210 and network device 220 may be established over a private or public IP network, e.g., over a network inside an organization or over the internet. It will be understood that not all possible in-band channels are shown in FIG. 2, e.g., although it may be established, an in-band channel between edge device 240 and computing device 210 is not shown.

An embodiment may provide, to at least two devices, a secret (e.g., one or more secret values 128 that may be used for encrypting data) without exposing the secret to any device other than the at least two devices, that is, an embodiment may make it impossible for any device other than the two devices to reveal the secret. For example, a secret may be revealed by the two devices using a first value that may be provided or known to, or obtained by, the two devices (e.g., one of known values 127) and a second value that may be randomly selected by one of the devices (e.g., one of generated values 126) wherein the first value is communicated or provided over a first channel (e.g., an out-of-band channel) and the second value is communicated or provided over a second channel (e.g., an in-band channel).

An embodiment may authenticate a first device by, or to, a second device in a manner that makes it impossible for any third or other device to obtain enough information that may enable the third or other device to be falsely authenticated. For example, a successful establishment of a secured channel between edge device 240 and network device 220 may cause edge device 240 to identify or mark network device 220 as an authenticated device.

Reference is made to FIG. 3, an illustrative example of a system 300 according to some embodiments of the present invention. As shown, system 300 may include servers on the cloud 330, an in-house network 360 and, in the in-house network 360, a computing device and application 310, a hub 323 and a set of edge devices 324.

Cloud servers 330 may be similar to server 230, edge devices 324 (that, as shown may include devices such as a refrigerator, air conditioning system and a washing machine) may be similar to edge device 240, hub 323 may be similar to network device 220 and computing device and application 310 may be similar to computing device 210. For example, each of servers 330, hub 323, device and application 310 and edge devices 324 may include a controller, memory and executable code as described with respect to computing device 100 and/or servers 330, hub 323, device and application 310 and edge devices 324 may include an SEU such as SEU 211.

In some embodiments, pairing two devices for the first time may include using at least two communication channels, one of which may be an out-of-band communication channel (also referred to herein as out-of-band channel). Pairing devices may include authenticating the devices to one another and/or establishing a secured communication channel between the two devices. For example, when a new washing machine (edge device) that includes IoT capabilities as described herein is first connected to in-house network 360, a user may use device 310 (e.g., a smartphone as shown in FIG. 3) to obtain a value (e.g., a unique serial number) by scanning a barcode on the washing machine.

The value obtained by device 310 as described may be known to the washing machine, e.g., the unique serial number may be stored in ROM of an IoT component in the washing machine and/or in an SEU in the washing machine. Accordingly, possibly using an out-of-band channel, e.g., a line of sight between a user of computing device 310 and the washing machine, a value in a barcode may be (or may be used to define, calculate or generate) a value that is known to the washing machine (a first device) and device 310 (a second device), for example, the value in the barcode may be stored as one of known values 127 in a smartphone and in the washing machine.

A second value may be known to the washing machine and smartphone (the two devices) in a similar way, e.g., a second value that is a unique ID of the washing machine may be generated and stored in a ROM of the washing machine (e.g., by a manufacturer) and may be displayed, by an SEU in the washing machine, on a control screen of the washing machine thus enabling a user to read and enter the second value into an SEU of device 310. For example, the second known value may be stored as another one of known values 127 in SEUs in the washing machine and a smartphone. Accordingly, two out-of-band channels may be used in order to achieve a state where two devices have, store, include or possess a first and second values. It is noted that using an out-of-band channel for sharing at least one of the first and second values (also referred to herein as shares used for secret sharing) as described prevents devices connected to network 360 from knowing or having both the first and second values since at least one of these values is never communicated over a computer communication network.

In some cases, the first value may be shared using an out-of-band channel as described and the second value may be shared over a network, in-band connection or channel. For example, an SEU in smartphone 310 may randomly generate the second value and send the generated second value to the washing machine over network 360, e.g., in a UDP packet. Of course, a device (e.g., a network sniffer) on network 360 may intercept the communication of the second value; however, as described herein, the second value may be useless without the first value.

In some embodiments, using a first and a second values (e.g., a known value 127 and a generated value 126) known to two devices, a secret may be revealed by, or known to, the two devices. For example, the secret may be a third value that may be calculated or determined based on the first and second values. For example, using one or more known values 127 and one or more generated values 126, one or more secret values 128 may be calculated, derived or determined and may be stored in a memory as shown by secret values 128.

An authentication may be based on one or more secret values 128. For example, to authenticate the washing machine in the above example, an SEU in device 310 may, using one or more secret values 128 as an encryption key, encrypt a message (for which a respective specific response is expected) and send the encrypted message to the washing machine (e.g., to an SEU in the washing machine), if a response from the washing machine is as expected then the SEU in device 310 may determine or conclude that the SEU in the washing machine knows, includes or has the secret and is therefore authenticated, e.g., since the SEU in the washing machine successfully decrypted the message, generated an expected response, and encrypted the response. An authentication of a device may be explicit, e.g., as described herein or it may be implicit, e.g., successful exchange of data that is encrypted using a secret value 128 may authenticate a device, e.g., the washing machine may be authenticated by a smartphone if it sends expected data or messages or correctly responds to messages.

As described, any number of generated values 126 may be used for defining or calculating one or more secret values 128. For example, a secret value 128 may be the free coefficient of a polynomial or the highest coefficient of the polynomial (also referred to as the first and last coefficients of the polynomial). Accordingly, to determine or calculate a secret value 128, an SEU may use several points on a curve representing the polynomial.

For example, a polynomial $p(x)$ of degree K may be defined or represented by:

$$p(x)=S+a_1*x+a_2*x^2+\ldots a_k*x^k \qquad \text{Equation 1}$$

In some embodiments, S and/or $a_k$ in equation 1 may be treated and used as secret values 128, e.g., S and/or $a_k$ may be stored as secret values 128 and used for authentication and encryption, by SEUs, as described. In some embodiments, the coefficients $a_1 \ldots a_k$ of $p(x)$ may be randomly chosen, e.g., by an SEU. A set of at least K+1 values (or inputs) for a set of $x_0 \ldots x_k$ may be randomly selected or chosen, e.g., by an SEU, and a respective set of values (or results or outputs) $y_i$ may be calculated by $y_i=p(x_i)$. Accordingly, a set of pairs $(x_i,y_i)$ for $p(x)$ may be generated. A pair of values $(x_i, y_i)$ calculated for a polynomial as described may be referred to herein as a point on, or of, the polynomial. Using K+1 points of a polynomial of K degree, the polynomial can be constructed and S (or $a_0$, the free coefficient) and/or $a_k$ (the highest or last coefficient) can be revealed. For example, in order to construct the line equation $p(x)=ax+b$, 2 points $(x_1,y_1)$ and $(x_2,y_2)$ are required and sufficient and the two points enable determining the value of b.

For example, a first pair of $(x_i,y_i)$ values of $p(x)$ may be stored in a first generated value 126 in edge device 240 and in network device 220, a second, different, pair of values $(x_{i+1},y_{i+1})$ may additionally be stored in a second, different, generated value 126 of both edge device 240 and network device 220 and so on. Accordingly, each of edge device 240 and network device 220 may obtain, possess, store or include at least K+1 pairs, values or points of or on $p(x)$, may therefore unambiguously identify or characterize $p(x)$ and thus determine S and/or $a_k$ in equation 1.

As described, a degree of $p(x)$ may be predefined (e.g., hard coded or otherwise known to two or more SEUs). To increase security, in some embodiments, the degree of $p(x)$ may be selected or set dynamically or automatedly, e.g., a first device may randomly select the degree and inform the second device of the degree. In yet other embodiments, using a function or logic that takes into account, for example, the current date, current time or other dynamic value, two SEUs may determine the degree of $p(x)$ that will be used. Once the degree of $p(x)$ is known to two devices, the two devices may readily know the number of points that need to be shared as described.

In some embodiments, two or more devices may share the generation of values or points that define a polynomial. Moreover, in some embodiments, a polynomial p(x) needs not be defined, predefined or known in advance. For example, p(x) may be defined (and identified) based on a random set of points or pairs of $(x_i, y_i)$ values that may be generated or selected by two devices.

For example, a set of at least K+1 of points (e.g., pairs of input and output values of the polynomial) for a polynomial may be randomly selected (e.g., some may be selected by a first device or entity, and some by another or second device or entity) and may be sent from one entity or device to another entity or device such that none of the devices on or along the routes that are used can obtain, capture, intercept or see K+1 or more points. It is noted that a subset of less than K+1 points is useless in determining, identifying or characterizing a polynomial of degree K, for example, one point (e.g., one set of $(x_i, y_i)$) is insufficient or useless for determining, identifying or characterizing a polynomial p(x) of degree K=1 defined or characterized by $a_0+a_1 x$ since at least K+1 (2 in the case of K=1) points are required in order to define, determine, characterize or unambiguously identify polynomial of K degree.

For example, SEU 211 may randomly select a degree of six (K=6) for a polynomial and may further randomly select three (3) points, or pairs of input and output values of the polynomial, and send the degree and the three points to SEU 221. SEU 221 may randomly select four (4) points or pairs and send the selected four points to SEU 211. Thus, an embodiment achieves a state where SEU 211 and SEU 221 both have seven points for a polynomial of degree six and are therefore able to unambiguously identify, determine or characterize the polynomial and its coefficients (e.g., $a_0$, $a_1$ and so on). As described, the points or pairs may be communicated between SEU 211 and SEU 221 over at least two different network routes, such that no single entity on, or connected to, network 250 (or any other network for that matter) can obtain K+1 pairs or points included in the set of at least K+1 pairs or points exchanged between a first and a second device as described.

Routes, links, connections and/or channels as described herein may be logical, physical or a combination thereof. For example, a logical route, link or channel may be a TCP connection or an SSL connection and a physical route, link or channel may be a direct line or data bus connecting two or more devices. For example, several routes, links and/or channels may be established between computing device 210 and edge device 240 using a set of TCP connection (logical) and one or more physical lines, routers or wires (physical). A set of different logical connections may be established over one or more physical connections. Generally, a set of logical routes, links or channels may be established over the same infrastructure, e.g., same network cables and routers. For example, a set of different applications or social networks (e.g., Facebook, WhatsApp and the like) may use the same infrastructure to setup and use a set of different logical connections that use different protocols, encryption techniques, etc. A set of different physical routes, links, connections and/or channels may be established on a respective set of different infrastructures, e.g., a wired network infrastructure, a cellular network and/or WiFi.

As further described herein, different routes, links, connections and/or channels may include, traverse or established using different devices or nodes. For example, a first route, link, connection and/or channel between server 230 and edge device 240 may be established through or via network device 220 (e.g., using routing as known in the art) and a second route, link, connection and/or channel between server 230 and edge device 240 may be established through or via computing device 210. A link, connection or channel may be an out-of-band link, channel or connection as further described herein.

After constructing the polynomial from the K+1 pairs, SEU 211 and SEU 221 may calculate or reveal a secret, e.g., the secret revealed, identified or determined by SEU 211 and SEU 221 may be based on a function of, or applied to, the polynomial or points of the polynomial. For example, a secret may be a function, or a result of a function of, or applied to, at least one of the first and/or last coefficient of the polynomial as described. A function of, applied to, or that uses as input, at least one of the first and last coefficients of a polynomial may include any mathematical manipulation of numbers that produces a result as known in the art. For example, a function of at least one of the first and last coefficients of a polynomial may include multiplying the free coefficient of a polynomial by the highest coefficient, or it may include dividing the highest coefficient by the free coefficient and then adding one of these coefficients to the result. A result of a function of at least one of the first and last coefficients of a polynomial may be a number or value, e.g., an output or result of a mathematical function as known in the art.

Any function, mathematical function or mathematical computation (e.g., one known only to SEUs) may be applied to a secret in order to determine or generate an encryption key, seed or other value that may be used for securing a communication channel. For example, to generate an encryption key that may be used to encrypt data or otherwise secure and authenticate a communication channel between SEU 211 and SEU 221 and/or between computing device 210 and network device 220, a coefficient of a polynomial determined, discovered or identified as described may be multiplied by two, divided by three and the like, and the result may be the encryption key, seed and the like.

It will be noted that the two devices sharing a secret as described herein may be any two devices, e.g., a client and a server such as computing device 210 and server 230 may each generate some of the K+1 points that define a polynomial, share the points as described and thus reveal or determine a secret that may be based on a function of the polynomial, and likewise network device 220 and edge device 240 may share a secret. It will be understood that any computing device may include an SEU as described and, accordingly, any computing device may participate in sharing a secret as described herein.

As described, a set of values (e.g., a set of points of a polynomial) may be sent or exchanged between devices over a set of different routes or communication channels. For example, SEU 211 may generate a set of K+1 points, store the set in a local set of generated values 126 and send the set of K+1 points to SEU 221 using (at least) two (physical or logical) different channels, e.g., using an in-band and an out-of-band channel, two out-of-band channels, two in-band channels or any combination of channels or routes as described.

Secret value 128 may be calculated separately on both devices or sides, e.g., SEU 211 and SEU 221 may each, independently from one another, determine or identify p(x) based on K+1 points as described, determine the free or highest coefficient of p(x) and use the coefficient as, or to generate, secret value 128, e.g., secret value 128 may be the coefficient itself, or it may be calculated based on the coefficient using any mathematical function or algorithm, for example, secret value 128 may be calculated, by SEUs, based on a coefficient of p(x) and based on the current time and/or date or using any mathematical function, algorithm or logic.

In some embodiments, to share a secret (e.g., an encryption key or a seed as known in the art) between two devices, at least two values may be provided, or made known to, the two devices, for example, the two values may each be, or include or represent, a point, or a pair or set of input and output values $(x_i, y_i)$ of a polynomial p(x) and the secret may be a function of, or based on, these values, e.g., a mathematical function or manipulation of, or applied to, coefficients of a polynomial defined by the points as described.

It is noted that the at least two values may be randomly selected by the first device or may be randomly selected by the first device and the second device. For example, the first device may randomly select a first point of p(x) and send the first point to the second device, and the second device may randomly select a second point of p(x) and send the second point to the first device. Assuming p(x) is of first degree, the two points randomly selected as described enable the two devices to unambiguously identify p(x). Of course, any higher degree of p(x) may be chosen and used, e.g., by causing embodiments to randomly select share more points as described.

As described, embodiments of the invention address challenges faced by the industry. For example, unlike any other existing authentication schemes, some embodiments of the invention avoid exchanging or communicating a secret, avoid sending a secret over a network as done by known systems and methods. For example, secret value 128 may be known (e.g., based on a set of points as described) to SEU 241 and SEU 221 without ever being transmitted or sent from one of these SEUs to the other.

The process of generating, sending and using a set of values to determine a secret as described herein may be done either once for two devices, e.g., on initialization, or may be done before each session. For example, a communication channel between edge device 240 and network device 220 may be terminated as known in the art and, to establish a new channel between these devices, the flow that includes generating and sharing values, identifying or constructing a polynomial, determining a coefficient and a secret as described herein may be repeated. For example, a first point may be defined (provided or sent) once (e.g., when a new device is added to a network), e.g., over an out-of-band channel and the other points may be sent over a network before each session.

Although examples that include providing a first value to a first device over an out-of-band channel and providing a second value (to the first and/or to a second) device over an in-band channel are described herein, it will be understood that any combination of in-band channels and out-of-band channels may be used to share values or points between two devices. For example, two different routes or in-band channels may be used to share or communicate points between network device 220 and edge device 240 or two out-of-band channels may be used to share values or points between these two devices. It will further be understood that, for the sake of clarity and simplicity, the description mainly refers to two values shared over two channels, and any number of values may be shared over any number or combination of channels that may be out-of-band and in-band channels. For example, to authenticate edge device 240 to computing device 210, a polynomial of degree 5 may be used and, accordingly, six different values may be shared between edge device 240 to computing device 210 as described, e.g., over two out-of-band channels and four in-band channels.

Yet another improvement to the field of security and authentication introduced or enabled by some embodiments of the invention has to do with providing an edge device with a first or initial point or value that may be used, in conjunction with a second value sent before each session, to determine a secret used for securing data as described. For example, using an initial value, edge devices do not need to keep or store a private key when they are not communicating over a network. This may be highly advantageous, e.g., in cases where the edge device does not have the capacity to dynamically and securely store data, for example, in that case of IoT devices or environment where the edge devices have low CPU power and minimal unsecured hardware (e.g. a light bulb).

A number of scenarios, use cases and/or flows that exemplify some embodiments of the invention are further described herein with reference to FIG. 3. For example, channels that may be secured are between hub 323 and device (or application) 310, between, or connecting, hub 323 and one or more of edge devices 324, between one or more of servers 330 and device (or application) 310, and between servers 330 and hub 323.

For example, to secure a channel between hub 323 and device 310, a Quick Response (QR) code or a two-dimensional barcode of hub 323 may be provided, e.g., by scanning printed data on hub 323 (an out-of-band channel), to device 310. Hub 323 may be familiar with the QR code (e.g., it may be stored in a ROM in hub 323). As known in the art, a QR code may be a machine-readable optical code or label that contains or represents information about an object, item or appliance to which it is attached. Any information or value, e.g., a serial or model number, a unique identification code, production date and the like may be included in, or represented by, a QR code.

In some embodiments, a value in a QR code (e.g., a value in a QR code printed on hub 323) may be used as one or first point of or on p(x), and a second point may be randomly generated by device 310 or by hub 323. For example, hub 323 may, e.g., when turned on, generate a random value or second point and send the second point to device 310, e.g., over network 360 (an in-band channel). The two points may be used to determine a secret, e.g., secret value 128 as described. It is noted that the secret may never be sent over network 360 or over any other network, and thus it may be impossible for any device on network 360 or network 130 to obtain the secret.

Yet another improvement to the field of security and authentication introduced or enabled by some embodiments of the invention is related to lost, stolen or malfunctioning devices. For example, if hub 323 is stolen or replaced, data in hub 323 cannot be used for hacking communication of a replacement hub, and similarly, if device 310 (that may be a mobile device or smartphone) is lost or stolen, data in device 310 cannot be used to jeopardize communication in network 360, e.g., since at least a second point as described may be dynamically defined, e.g., for each session or each time hub 323 is rebooted, reset or powered on.

To secure a channel between hub 323 and one of edge devices 324, a Quick Response (QR) code or a two-dimensional barcode of the edge device may be provided, e.g., by a user, to hub 323 (an out-of-band channel), and the rest of the flow may be similar to the flow of securing a channel between device 310 and hub 323. As described herein, a lost or stolen edge device does not include data usable for decrypting data communicated between devices on network 360, e.g., since a second point as described may be dynamically generated for each session thus a point in a memory of a stolen edge device may be useless.

To secure a channel between one of servers 330 and device 310, multiple channels, e.g., a number of SSL channels, a push notification from the cloud server to device 310 (e.g., to SEU 211), an SMS, a WhatsApp or any other communication channel may be used. Each of the channels may be secured by the application that is used to send data over it, for example, only the owner of device 310 can send push notification to SEU 211 or channels may be secured by a cloud service (e.g. as provided by Apple or Google).

Some embodiments may include inductive multi-route authentication and common secret establishment using parties or devices that already (possibly incrementally) established trust (possibly via inductive multi-route authentication and common secret establishment) with a new device by using secret sharing. For example, a device (e.g., denoted "device A") may use authenticated and secure communication with one or more entity/device that are capable to communicate with a new or additional device (e.g., denoted "device N") with which there is a need to create a common secret, e.g., in order to authenticate the new device N and/or establish a secured channel between device A and new device N. Some values or points may be sent, to device N, through direct physical/logical communication channels while other values or points may be sent, to device N, via an already trusted entity or device (possibly trusted due to the previous steps of the inductive multi-route authentication and common secret establishment).

Accordingly, authenticity or trust level of the new device N may be yielded from, based on, or a function of, the authenticity of each of the already trusted or authenticated devices that directly communicate with the new device and the corresponding authenticity or trust level of the direct channel used by device A when directly communicating with device N. The authentication level obtained implies also the secrecy level obtained following the establishment of a shared key or other secret between the sender and the new device. For example, device A may be server 230, new device N may be edge device 240 and SEU 231 may use an already trusted or authenticated connection between server 230 and network device 220 to send one of a set of values to edge device 240, e.g., SEU 221 may receive a value from SEU 231 and may forward the value to SEU 241 over a secured communication channel, e.g., a communication channel secured as described herein.

A secured channel between a first and a third device may be used for communicating a point (or any other value in a set of values that may be used for sharing a secret as described) from the first device to a second device. For example, one of servers 330 may use a secured channel with device 310 (e.g., a channel secured as described herein) to send a point or first value to hub 323, e.g., device 310 may receive the first value from one of servers 330 and send the first value, over another secured channel, to hub 323 thus resulting a state where the server and hub 323 have or possess a first known value, e.g., the server and hub 323 store (and treat) the first value as a known value 127. Next, either one of hub 323 and the server may generate, e.g., randomly as described, a second value or point and send the second value or point to the other one of hub 323 and the server, having at least two points, and the server and hub 323 may identify or reveal a secret as described and use the secret to encrypt data exchanged between the server and hub 323, e.g., a secret value 128 may be used for generating or defining, an encryption key. It is noted that one of the points may be sent over a route that traverses device 310, and the other point may be sent directly from hub 323 to server 330—thus, the two points are sent over different routes, disabling any device other than hub 232 and server 330 (or other foreign party) from obtaining the two points or values. The order of authenticating devices in the above example may be other than described; for example, if hub 323 provides an interface to manually enter the first value or point, then the secured channel between hub 323 and one of servers 330 may be setup first, and the secured channel between the server and device 310 may come next.

As described, based on a common or known secret, devices may authenticate each other. Possibly after an authentication as described, an embodiment may enable a protected and/or secured exchanged of data between devices.

In some embodiments, data communicated from one device to another may be sent over several channels, routes, links or lines, e.g., data may be sent over several channels or routes as described herein with reference to the points or value pairs. Different channels or routes may include or traverse different sets of devices. For example, a first channel, route, link or line between a first and second devices may traverse, pass, or be implemented using a third device (e.g., a first network router or any other device), and a second channel, route, link or line between the first and the second devices may traverse, pass, or be implemented using a fourth device (e.g., a second, different network router or any other device).

In some embodiments, a data object to be sent (e.g., a message or file) may be broken into chunks, blocks or pieces, and the chunks blocks or pieces may be sent over at least two channels, routes, links or lines such that no entity or device can obtain or possess enough chunks or pieces of the data object for reconstructing the data object.

For example, in some embodiments, between each two devices (e.g., between device 310 and hub 323) there are at least two different channels, links or routes (e.g., at least two different physical or logical channels, links or routes as described). Each such channel may be composed of two or more links, where each link may be a secure channel between two entities. For example, in a smart home, a light bulb can communicate with a central hub in two channels, of which one or first channel may be a direct channel, link or connection from the light bulb to the hub, and the other, second channel may pass through some other device, such as a refrigerator, and thus the second channel may be composed of two secure links, one from the light bulb to the refrigerator and the other from the refrigerator to the hub.

A secret, e.g., secret value 128 may be used for securing or protecting data, e.g., as known in the art, for example, secret value 128 may be used as a symmetric key in a symmetrical encryption algorithm or technique, e.g., in AES256 as known in the art.

Figure 4A:
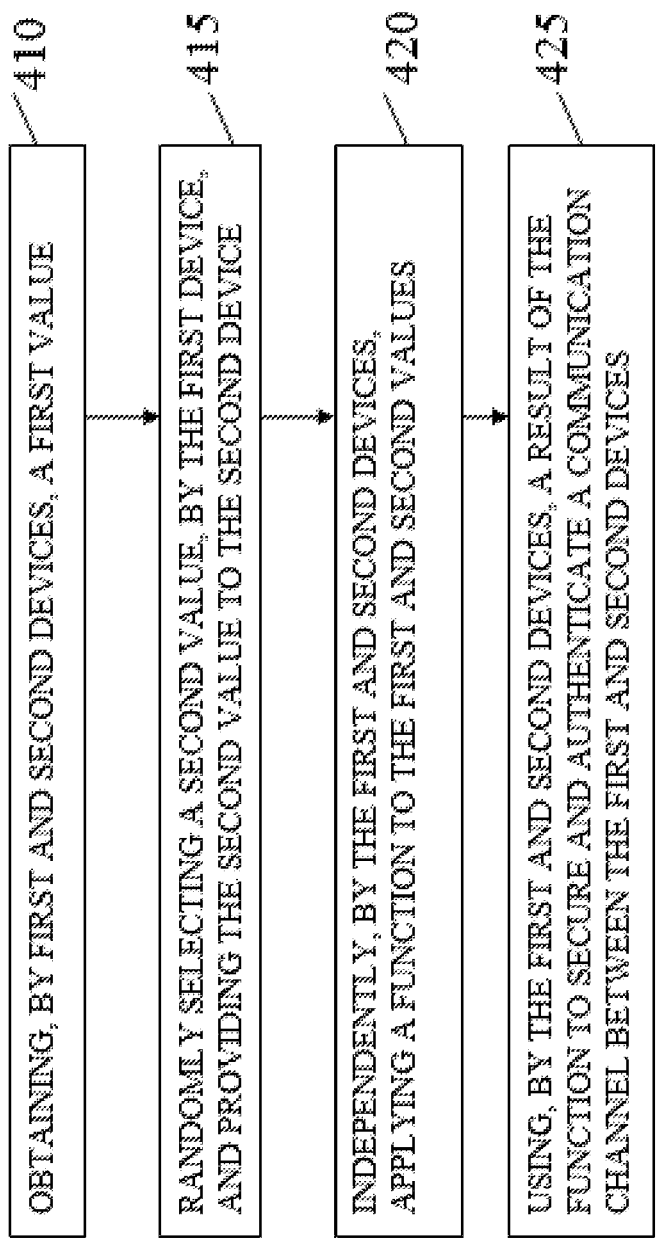
FIG. 4A shows a flow chart of a method according to illustrative embodiments of the present invention.

Reference is made to FIG. 4A, a flowchart of a method of securing a communication channel and/or authenticating a device according to illustrative embodiments of the present invention. As shown by block 410, a first value may be provided to, or obtained by, first and second devices. For example, SEU 211 in computing device 210 and SEU 221 in network device 220 may obtain and store a known value 127 as described herein. For example, the first value may be based on a barcode provided over an out-of-band channel as described.

As shown by block 415, a second value may be randomly selected, by one of the first and second devices, and the second value may be provided to the other one of the first and second devices. For example, SEU 211 may randomly select an ($x_i$, $y_i$) point as described and send the values of $x_i$ and $y_i$ to SEU 221, e.g., over a network connection in network 360 (an in-band channel) as described. For example, the point values $x_i$ and $y_i$ may be sent from one of SEU 211 and SEU 221 to the other one of SEU 211 and SEU 221, and may be stored or included as known value 127 in SEU 211 and in SEU 221.

As shown by block 420, a function may be applied, independently by each of the first and second devices, to the first and second values. For example, the first and second values may be used, independently, by the first and second devices to calculate, define or determine a third value. For example, a mathematical function may combine, convert or otherwise manipulate the first and second values to generate an encryption key that may be used for encrypting date communicated between the first and second devices. In some embodiments, coefficients of a polynomial determined by the first and second values may be used, for example, SEU 211 may independently from SEU 221, e.g., without requiring any communication, collaboration or synchronization with SEU 221, identify or determine polynomial's coefficients as described. Similarly, SEU 221 may identify the coefficients independently from SEU 211, and any mathematical function may be used by SEUs 221 and 211 for generating an encryption key based on the coefficients. Accordingly, two devices may, independently from one another, use two values to secure a communication channel between them or to authenticate each other.

Various flows of providing the first and second values may be contemplated. For example, the first value (e.g., a known value 127) may be provided to the first and second devices, e.g., a user may enter a known value 127 to his smartphone and to hub 323 (e.g., when hub 323 includes the proper interface). In other embodiments or flows, the first value may be provided to one of the devices (e.g., to hub 323) and sent over an out-of-band channel to the other device.

As shown by block 425, a result of the function may be used to secure and authenticate a communication channel between the first and second devices. For example, a result may be third value that may be an encryption key or seed that may be used for encrypting data as described. Accordingly, the third value may be used, by the first and second devices, to secure and authenticate a communication channel between the first and second devices. For example, secret value 128 may be used as, or for generating, an encryption key for encrypting data between devices as described. For example, secret value 128 may be used to define an encryption key and the encryption key may be used to encrypt data communicated over a secured communication channel as described herein.

Authentication of a device may include determining or ascertaining that the device possesses a specific set of first and second values. For example, secret value 128 may only be revealed or known based on at least two values, e.g., based on two generated values 126, based on two known values 127 and/or based on a set of one generated value 126 and one known value 127 as described, and accordingly, using secret value 128, e.g., to encrypt and send a predefined message, may prove or ascertain that a device has the two values and is therefore authenticated.

Any number of generated values 126 may be used, e.g., during a process of authenticating a device or sharing a secret value such as secret value 128. For example, if the polynomial selected as described is of a third degree, then four points may be required. In such case, the first of the four may be a known value 127 shared as described, and three generated values 126 that may be generated and sent, over multiple routes as described.

It will be noted that generating, creating or defining generated values 126 may be done by one of two devices between which a secure channel is established, or some of the generated values 126 may be created, defined or generated by a first device and sent to the second device and some (other) of the generated values 126 may be created, defined or generated by the second device and sent to the first device. For example, in the above case that requires four points, after sharing a known value 127, device 310 may generate first and second points (e.g., two sets of $x_i$ and $y_i$ values as described) for a polynomial and send these first and second points to hub 323, and hub 323 may generate a third point for the polynomial and send the third point or value to device 310. Having the same four points, hub 323 and device 310 may each identify the polynomial and the coefficients as described. Accordingly, the task or operation of generating, creating or defining generated values 126 may be shared by at least two devices.

As described, at least two routes may be selected for sending points or values, e.g., hub 323 may send, to device 310, a first generated value 126 through one of servers 330 and send a second generated value 126 through one of edge devices 324, and accordingly none of the devices or entities in system 300 can intercept, have or obtain enough points to unambiguously identify a polynomial since a flow may avoid communicating all the points through one device. For example, values or points may be sent, from a first to a second device such no single entity on a network obtains more than a predefined number of values or points included in the set.

For example, in the above case that requires four points, device 310 may select two, three or four channels, routes or links for sending the four points such that none of the entities in FIG. 3 can obtain, intercept or capture all of the four values or points. The routes selected may be logical routes (e.g., network routes) or physical routes or links (e.g., a direct line or an out-of-band channel as described). Accordingly, a first value may be sent over a first communication channel, and a second value may be sent over a second, different communication channel. The values, e.g., generated values 126, may be encrypted prior to being sent, e.g., using any known encryption techniques as known in the art.

In some embodiments and as described, sharing one or more values between first and second devices, e.g., sharing one or more generated values 126 or points as described, may include sending at least one of the one or more values, from the first device to a third device over a secured communication channel between the first and third devices, and using the third device to provide the at least one of the one or more values to the second device. Communicating a set of values (e.g., one or more points or generated values 126) from a first device to a second device may include sending at least one of the values, from the first device to a third device, and sending or forwarding the at least one of the values from or by the third device to the second device. Otherwise described, a first device may send a value to the second device via a third device.

For example, to authenticate edge device 240, device 210 may send a value (e.g., a point of a polynomial as described) to network device 220 (e.g., over a secured channel and/or after device 210 has authenticated network device 220), and network device 220 may send or forward the value received from device 210 to edge device 240. A second value or point may be sent from device 210 to edge device 240 over any other channel, e.g., an out-of-band or other channel as described herein.

In some embodiments, authenticating a device and/or securing a communication with the device may be automatically triggered. For example, SEUs in devices may listen and/or broadcast on predefined (or well-known) ports, for example, when a new device is connected to network 360, e.g., after a reset or addition of an IoT device, SEU 221 may receive a UDP broadcast message from an SEU in the new device and may automatically initiate a session or process for authenticating the new device and/or establishing a secured channel with the new device, e.g., share a secret with the new device and use the secret to encrypt data exchanged with the new device.

In some embodiments, a known or first value used for securing a session or communication channel as described may be shared between two devices using a secured channel established in a previous session. For example, after establishing a secured channel as described herein, one of the devices may send, over the secured channel, a value, token or key that may be used, in a subsequent session as one of known values 127. For example, after a secured channel is established between server 211 and computing device 210, server 211 may randomly generate a value, store the generated value and send the generated value to computing device 210 that may store the value, e.g., in configuration data 133 or as one of known values 127. When a new session or communication channel needs to be established, the value generated in the current session may be used. Accordingly, after a first secured channel is established between two devices, subsequent channels or sessions between the two devices may be established using a secret already available to, or included in, the two devices.

In some embodiments, an overlay technique may be used to secure communication scenarios such as client-server, business to business (B2B), client to business (C2B) and/or client to client (C2C). As referred to herein, a share or shares may be pieces or portions of data that may be used to determine or produce a secret or an original data object or value, e.g., a set of shares may be used to determine or reveal a password.

In some embodiments, an overlay technique may include secret sharing or other equivalent secure information theoretical schemes, e.g., exclusive-or, or exclusive-disjunction (xor) with a random sequence or using modular arithmetic as done, e.g. in one time pad practice as known in the art. An overlay technique may include sending shares (e.g., a set of values as described) over a set of communication channels, some or all of which are physical and/or some or all of which or are logical channels.

A logical communication channel may be, for example, a virtual private network (VPN), an SSL connection, a transport layer security (TLS) connection, a push notification, an instant messaging communication and/or any other system, method or protocol that may include authenticating and/or securing communication. Two or more logical communication channels may use the same physical channel or may use separate, different physical channels (e.g., wired and wireless channels as known in the art).

In some embodiments, an overlay technique may benefit from sending secret shares on (possibly encrypted) channels over physical and logical channels by ensuring that unless the information sent over all the channels used is captured and decrypted (when the logical channel is using its encryption) by a malicious entity, the information secret shares or other sent information is protected and secured. Accordingly, using an overlay technique or security as described herein, some embodiments of the invention may provide security that is stronger than the strongest authentication and security among the physical and logical channels used for sending the secret shares, as information on all channels should be revealed to expose a (possibly encrypted) secret shared or other information.

In some embodiments, an overlay technique may provide and/or ensure automatic inheritance of the secrecy, security and/or authenticity updates and/or enforcement of each of the logical and/or physical routes, links or communication channels. In some embodiments, a communication channel may be authenticated and secured even if a vulnerability in all but one of the channels used is exploited. In some embodiments, error correction techniques (e.g., the Berlekamp-Welch or Welch-Berlekamp algorithm) may be used for coping with malicious channels.

Figure 4B:
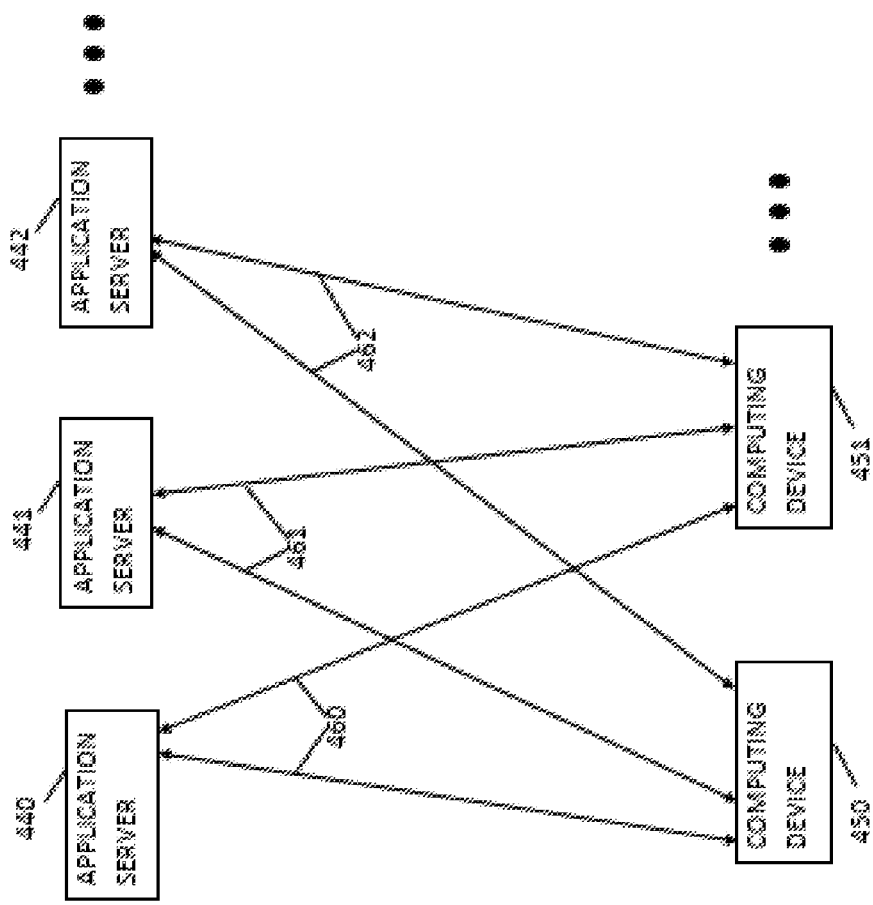
FIG. 4B shows a system and flows according to illustrative embodiments of the present invention.

Reference is made to FIG. 4B, a system and flows according to illustrative embodiments of the present invention. As shown, a system may include a plurality of application servers 440, 441 and 442. For example, application servers 440, 441 and 442 may be servers owned and/or operated by application providers such as WhatsApp, Facebook and the like. As shown, a system may include a plurality of computing devices 450 and 451. Computing devices 450 and 451 may be devices similar to computing device 100, e.g., computing devices 450 and 451 may be servers, laptops, home computers, smartphones or any other user computer devices. For the sake of clarity and simplicity, only three application servers and only two computing devices are shown in FIG. 4B; however, it will be understood that any number of application or other servers and any number of computing devices may be included or connected to a system according to some embodiments of the invention.

As known in the art, WhatsApp, Facebook and other applications encrypt data communicated between users and/or data communicated between users and application servers. Security measures, such as encryption and the like provided by several applications and/or servers, may be overlaid by some embodiments of the invention such that the security provided by an embodiment may be an augmentation of several security features of several applications and/or servers. For example, generated values 126 (e.g., points, or pairs of input and output values of a polynomial) may be communicated between computing devices 450 and 451 using communication channels, security and/or infrastructure provided by several applications and/or application servers such as application servers 440, 441 and 442.

For example, after randomly selecting a degree of a polynomial and randomly selecting a point of the polynomial, computing device 450 may send the point to computing device 451 using a first application and/or via a first server, e.g., as shown by arrows 460. For example, application server 440 may be a WhatsApp server and computing device 450 may send a share or a point of a polynomial to computing device 451 using a WhatsApp message that may be encrypted by the WhatsApp application. Although not shown, in some embodiments or cases, an application message may be sent directly between nodes, e.g., a WhatsApp message that includes a point of a polynomial (or other generated value as described herein) may be encrypted by the WhatsApp application on computing device 450 and may be sent directly from computing device 450 to computing device 451. A second value, e.g., a generated value 127 or point for the polynomial as described may randomly selected and sent, e.g., from computing device 451 to computing device 450, using a second application or server as shown by arrows 461, a third value may be communicated using a third application as shown by arrows 462 and so on. Accordingly, secret shares, points or generated values 126 that may be used to authenticate devices and/or to secure a communication channel between devices (e.g., used for generating an encryption key as described) may be encrypted or otherwise secured by an overlay of security measures or methods provided by a plurality of applications, platforms and/or infrastructures.

Accordingly, the authenticity of a new device may be yielded from the authenticity of each of a set of already authenticated devices that directly communicate with the new device, and the corresponding authenticity level of the direct channel used by a device when directly communicating with the new device. The authentication level obtained implies also the secrecy level obtained following the establishment of a shared key between the sender and the new device.

It is noted that, as described, some embodiments of the invention may increase the security and/or authentication level exponentially. For example, a set of users or devices (e.g., the set of devices 450 and 451) each having an already established secured link with an application or server (e.g., with applications supported by servers 440, 441 and 442) requires or produces O(n) secured links, e.g., the O(n) secured links or channels are created or established using security measures or layers imposed by applications such as Facebook or WhatsApp, for example, the O(n) secured links may be secured by user passwords, data encryption, two-step-verification and/or various other techniques supported by servers and/or applications. By overlaying a set of secured layers as described, some embodiments of the invention may achieve a security level that is O(n^2).

For example, using a Facebook secured connection and a WhatsApp secured connection to share two values that are then used for creating an encryption key as described benefits from the security provided by Facebook and from the security provided by WhatsApp. Accordingly, an embodiment may include establishing or sharing keys or other secrets between any two, previously not known to each other, entities where each of the entities has an independent secure link with an application, server or platform (e.g., Facebook, WhatsApp etc.). Using the O(n) secured links of these entities, an embodiment may create O(n^2) keys or secrets that may be sent over O(n^2) different channels or links thus exponentially increasing the security of a system making it practically impossible for a hacker or malicious entity to obtain keys or other secrets used for encrypting data or otherwise secure and protect data communicated between devices.

Some embodiment may address the challenge of securing client server communication and authentication. For example, some embodiments may enable both a client and a server to be identified and/or authenticated to each other and to further be securely connected through an entire communication session. For example, some embodiments may provide authentication that enables a server to guarantee or verify that it is communicating with the right client, e.g., not with an entity that stole the identity of the client (e.g., using identity theft as known in the art). Some embodiments may provide authentication that enables a client that it is indeed communicating with the right or intended server, e.g., eliminating or overcoming phishing attacks or man-in-the-middle (MITM) attacks. Some embodiments may provide privacy, e.g., by eliminating data in motion attacks. Some embodiments may provide security related to client approval or confirmation, e.g., approval of transactions.

As further described, some embodiments may be applicable to any computing device, e.g., mobile phones or other mobile devices, home or other computers, servers and the like. Some embodiments may require no change to existing computing devices, may easily integrate with existing environments and may provide complete, full proof protection against attacks such as MITM, phishing and data in motion attacks. Some embodiments use a secret sharing scheme for distributing a secret among multiple participants.

Figure 5:
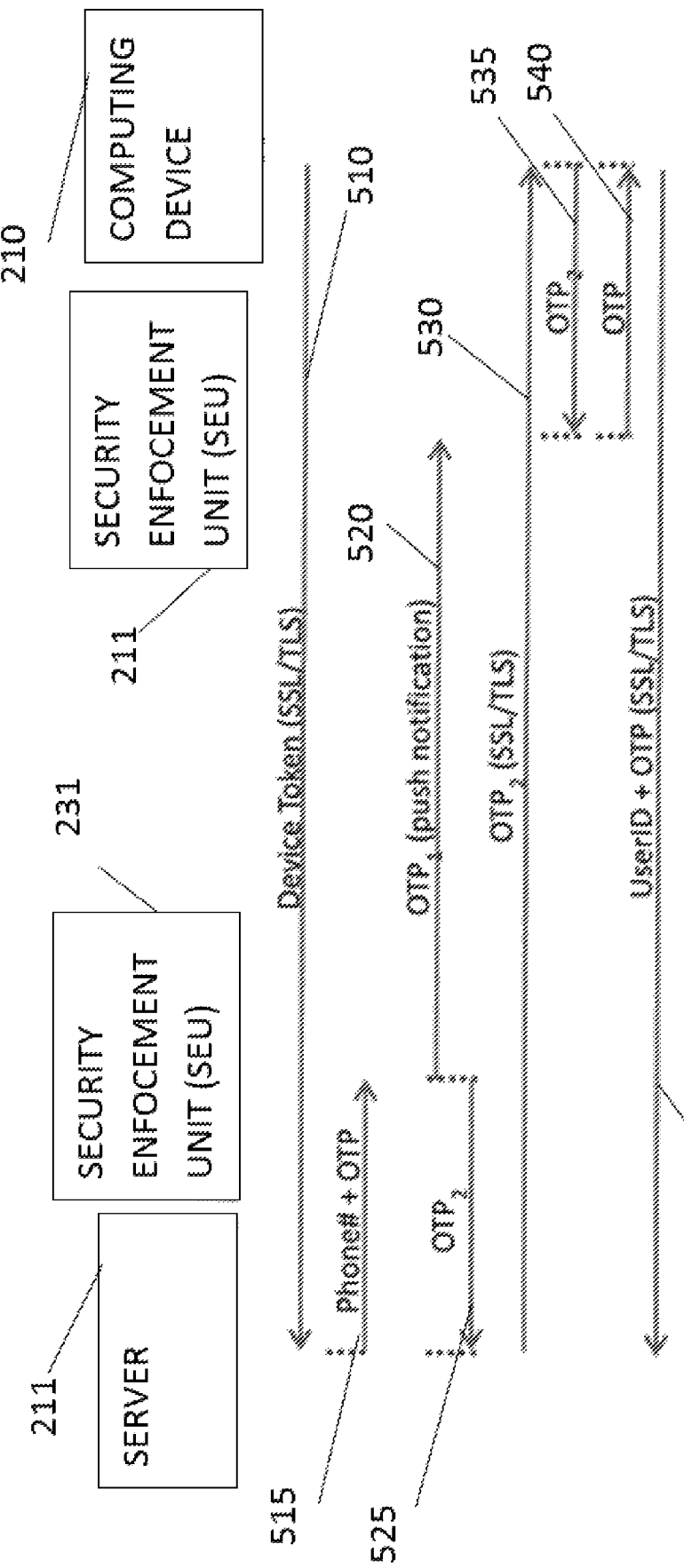
FIG. 5 shows a flow chart of a method according to illustrative embodiments of the present invention.

Reference is made to FIG. 5, a flow chart of a method according to illustrative embodiments of the present invention. As shown by arrow 510, a device token may be sent by a client to a server. A token as referred to herein may be any value, code, key or data object or digital information. For example, a token may be a unique value or number generated for a user or for a device. A token sent from computing device 210 to server 211 as shown by arrow 510 may be a token stored or included in a smart mobile device, e.g., a token obtained during a prior one-time enrollment process of the client to server 211, for example, a token, code, key or other data object received by device 210 in an SMS message, in an email, or obtained from a human agent. In some embodiments, the flow shown in FIG. 5 may be repeated or performed for each session between a client (e.g., a user of device 210) and a server (e.g., server 211). For example, each time a user of computing device 210 logs into server 211, a token or code is sent from device 210 to server 211 as shown by arrow 510 thus starting the flow shown in FIG. 5. The token may be a device token that is stored on device 210 (e.g., in configuration data 133) or it may be provided to device 210 before each login or periodically, e.g., a device token may be replace once a month.

In some embodiments, after server 211 receives a token from a device as shown by arrow 510, server 211 (or SEU 231) may randomly generate a one-time password (OTP). An OTP may be a password or another client certificate that may be used once (e.g., for one login) or it may be a password usable or valid for a limited time, e.g., an OTP may be valid or usable for the next hour or day. In some embodiments, SEU 231 in server 211 may use secret sharing or any other method to create, based on the generated OTP, two new shares, values or codes denoted in FIG. 5 as OTP1 and OTP2. For example, OPT1 and OPT2 may be similar to generated values 126 described herein.

As shown by arrow 520, OPT1 (one of the shares or values created based on the OTP) may be sent, over a first communication channel, to device 210. For example, OPT1 may be sent, from server 211 to device 210 using, or over, a network connection (e.g., an SSL connection) or using a push notification channel scheme or method. It will be understood that other communication channels may be used to send OPT1 to device 210 as shown by arrow 520.

As shown by arrow 525, OPT2 (the second share created based on the OTP) may be provided to server 211 (e.g., by SEU 231) and, as shown by arrow 530, OPT2 may be sent, using a second communication channel, to device 210. It is noted that, in some embodiments, the channel, route or link used for sending OPT2 is different from the channel, route or link used for sending OPT1. For example, OPT1 may be sent over a wireless network, and OPT2 may be sent over a wired network. For example, to send OPT1 and OPT2, two different in-band channels may be used, two different out-of-band channels may be used, or one in-band and one out-of-band channels may be used such that OPT1 is sent over a first channel and OPT2 is sent over a second, different channel.

As shown by arrow 535, computing device 210 may provide the received OPT2 to SEU 211 and, using OPT1 (received as shown by arrow 520) and OPT2, SEU 211 may construct the OPT. Accordingly, a state where both SEU 231 and SEU 211 (or both server 211 and computing device 210) have the OPT (which, as described, may be a randomly generated password or value) is achieved.

As shown by arrow 540, SEU 211 may provide computing device 210 with the OPT and, as shown by arrow 545, a user may login to server 211 using his or her name, a password or other credentials and the OPT. For example, to login to server 211, the user may send his or her user ID, password and the OPT over an SSL communication channel to server 211 as shown by arrow 545. At server 211, the OPT received from computing device 210 and other credentials of the user may be checked and, if a match is found, the login may be authorized or permitted.

In some embodiments, instead of, or in addition to, sharing an OTP as described, an encryption key may be shared. For example, a flow similar to the flow shown in FIG. 5 may be performed where, instead of an OTP, an encryption key is randomly generated and shares or values similar to OTP1 and OTP2 but generated based on the encryption key may be used to reconstruct the encryption key by computing device 210, thus achieving a state where both server 211 and computing device 210 have and use the same encryption key for encrypting data exchanged between server 211 and computing device 210.

Figure 6:
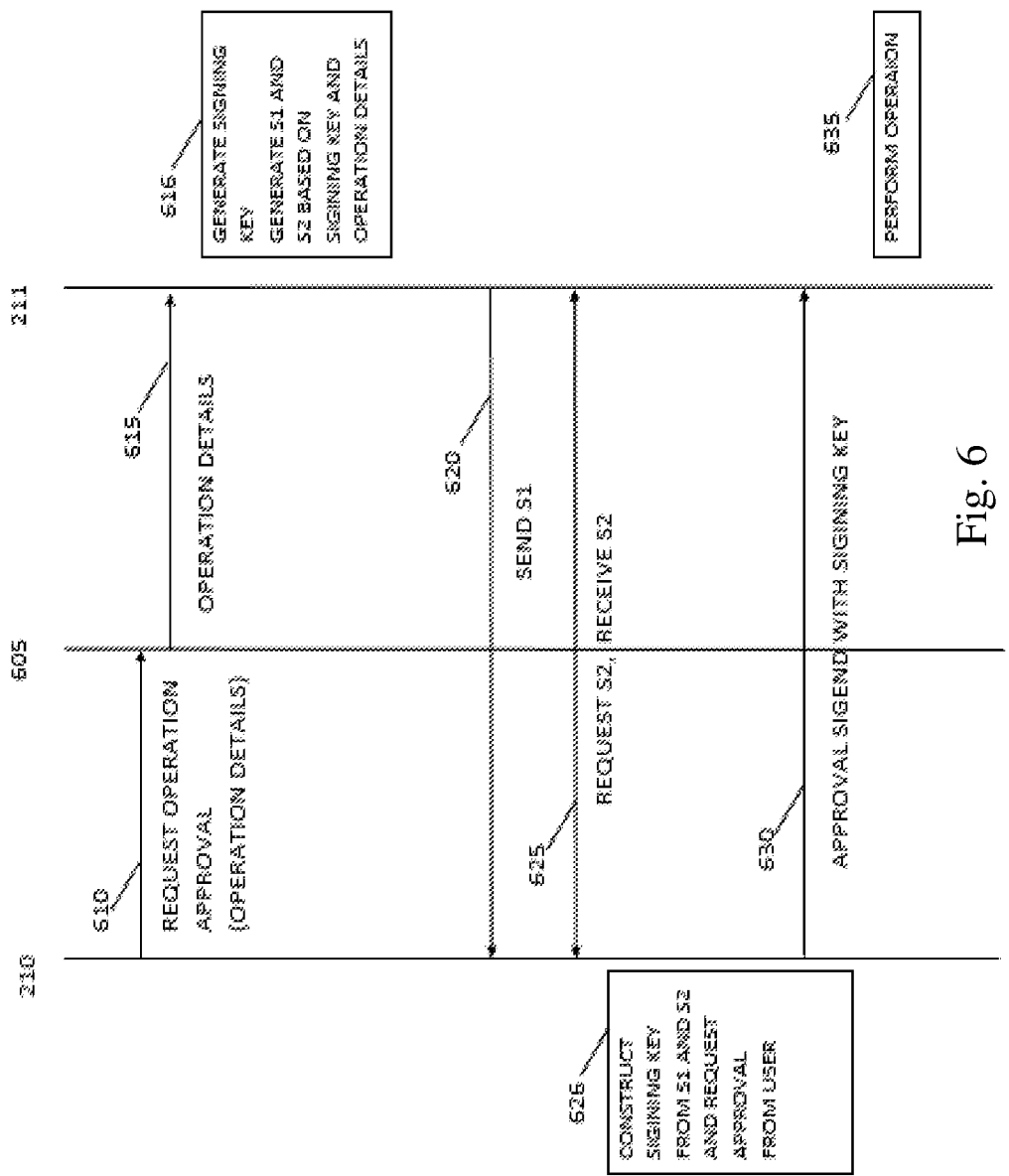
FIG. 6 shows a flow chart of a method according to illustrative embodiments of the present invention.

In some embodiments, a transaction or other operation may be securely approved. Reference is made to FIG. 6, a flow chart of a method according to illustrative embodiments of the present invention. As further described, in some embodiments, the flow shown in FIG. 6 may be performed by or it may include, computing device 210, a node 605 and server 211, and in other embodiments, two devices, e.g., node 605 and server 211 may perform the flow.

As shown by arrow 610, a request to approve an operation may be generated and sent, e.g., by computing device 210 (that may be a smartphone or a home computer) and based on input from a user. For example, the requested approval for an operation may be, or may include, a request to approve a transaction, e.g., a request to approve transfer of money from a user's bank account to some other account. As shown, the request for approval may include operation details, e.g., the sum to be transferred, a location of the user, a bank account number, user credentials and the like.

As shown by arrow 615, the request and the details may be sent to server 211. For example, node 605 may be a server of a bank to which a user may connect using computing device 210, and, upon receiving the request, the bank server may forward the request and the details to server 211. In some embodiments, node 605 may be an automated teller machine (ATM) or other computing device that may include an SEU as described herein, and accordingly, the flow may be performed without participation of computing device 210.

As shown by block 616, using, or based on, the request details, server 211 may randomly generate a signing key and may generate two shares or values (S1 and S2) based on the signing key and based on the operation details. Shares or values S1 and S2 may be, or may include, any digital object or data, e.g., shares or values S1 and S2 may be similar to generated values 126. It is noted that, by randomly generating the signing key, an embodiment may assure that the signing key cannot be predicted by any third party or entity.

As shown by arrow 620, a first value, e.g., S1, may be sent to computing device 210. Any communication channel or method may be used for sending S1 as shown by arrow 620; for example, in some embodiments, S1 may be sent using a push service as known in the art or S1 may be sent in an SMS message. As described, in some embodiments, S1 may be sent to node 605.

As shown by arrow 625, computing device 210 may, after receiving S1, request server 211 to send S2 and server 211 may send S2 to computing device 210. As described, in some embodiments, node 605 may, after receiving S1, request server 211 to send S2, and server 211 may send S2 to node 605. In some embodiments, the communication channel, method, infrastructure, route or link used for sending S2 is different from the communication channel, method, infrastructure, route or link used for sending S1, and accordingly, no device, network node or entity may obtain both S1 and S2. Any communication channel or method may be used for sending S2 as shown by arrow 625; for example, in some embodiments, S2 may be sent over a secured SSL or TLS connection.

As shown by block 626, using S1 and S2, computing device (e.g., SEU 211) may construct the signing key and possibly the operation details. It is noted that, since S1 and S2 are created based on the signing key and the requested operation, S1 and S2 may be used for reconstructing the signing key and the requested operation. As shown by block 626, a user may be prompted or requested to approve or confirm the operation, e.g., confirm or approve a transaction.

As shown by arrow 630, based on input from a user, an approval to perform the operation may be sent to server 211 with, or signed by, the signing key. If an approval to perform an operation signed by the signing key is received by server 211, then server 211 may perform the operation, e.g., perform a transaction or other operation as shown by block 635.

As described, in some embodiments or configurations, the flow shown in FIG. 6 may be performed by node 605 and server 211 that may be a server of a bank, e.g., operations performed by computing device 210 as described herein may be performed by node 605. For example, node 605 may be an ATM that includes an SEU, and, when the user uses the ATM get money from his or her account, the ATM may prompt the user to provide details and may send details as shown by arrow 615, the ATM may receive S1 as shown by arrow 620, the ATM may request and receive S2, the ATM (or the SEU included therein) may reconstruct the signing key, the ATM may present, on its screen, details of the requested withdrawal and prompt the user to confirm or approve the withdrawal, and the ATM may sign an approval with the signing key and send the signed approval to server 211 as shown by arrow 630.

Although FIG. 6 and related text describe using two values, shares or generated values (S1 and S2) other embodiments, flows or configurations may be contemplated, e.g., more than two shares or generated values may be used. For example, in some embodiments, a first value may be obtained by a user (or by device 210) from the node 605, e.g., by scanning a code printed on, or displayed by, an ATM, and the ATM may send the code to server 211, and thus a first value or share may be provided to computing device 210 and to server 211. A second value, share or generated value, e.g., S1, may be sent using push notification from server 211 to computing device 210, and a third value, e.g., S2, may be sent over a different communication channel, e.g., over an SSL or TLS connection from server 211 to computing device 210. The signing key may be reconstructed using the three values. Any other number of shares may be used, e.g., as described herein.

Although only two values (S1 and S2) are shown in FIG. 6, it will be noted that any number of values may be generated based on details of an operation or transaction, such that any information (e.g., textual strings, amounts and the like) may be used for a secured approval. For example, operation details sent as shown by arrow 615 may include a location of node 605 (e.g., the ATM) used as described, e.g., operation details may include the string "main street 317". Server 211 may construct a first pair of S1 and S2 that encodes or represents the character "m" (first character of the location), and may send S1 over a first channel and send S2 over a second, different channel. Next, server 211 may construct a second pair of S1 and S2 that encodes or represents the character "a" (second character of the location), and may send S1 over a first channel and send S2 over a second, different channel and so on.

Reconstructing data communicated using pairs of S1 and S2 values, the receiving end (e.g., computing device 210 or node 605) may present information such as location to a user, thus enabling enhanced security measures, e.g., in requesting approval from a user, node 605 (e.g., an ATM) may present, on a screen "Are you withdrawing $150 from an ATM at main street 317?" and may proceed to approve or cancel the transaction based on a response from the user.

Of course, any other number of values such as S1 and S2 may be used for representing data, e.g., a character, a sum of withdrawal or other data may be represented or encoded using any number of S1 values, e.g., three values S1, S2 and S3. For example, a character or sum may be (or may be determined based on) the free coefficient of a polynomial p(x) of degree K as described herein and the number of values S1 used for communicating the character or sum may be K+1 as described.

Some embodiments of the invention may address the challenge of enrollment, registration or enlistment. As known in the art, a hacker or other malicious entity may use data provided in the process of enrollment to register or enroll to a server, service or application. In some embodiments, an enrollment process, method or flow may include providing a key to an entity to be enrolled. For example, an administrator in an organization sends a key, e.g., in an email, to a new employee. An embodiment may include providing the key to a server or other enrollment management entity. For example, the administrator may send the key to a server of the organization. In some embodiments, user information may be sent to the server. For example, the name of the new employee or any other information identifying and/or known to a user that is to enroll with a server may be provided to the server, e.g., by an administrator. The key provided to a user or to an entity that is to enroll may be used as a known value 127 as described herein. For example, after the server and user have the key (a first value) as described, the server may randomly select any number of additional values (e.g., second and third values) and send the additional values to the user or enrolling entity, e.g., a second value may be sent using push and a third value may be sent over an SSL connection. In some embodiments, a randomly selected value may be sent over a communication channel that is different from the communication channel used for sending the key from the enrolling entity to the server. In some embodiments, both the server and the enrolling entity may use the key and randomly selected values to generate a value that may be used for enrollment and/or for encryption of data. For example, based on the key provided to a server and to a user (or an enrolling entity) and based on randomly selected values as described, the server and the enrolling entity may generate an enrollment key, token, code or value. The enrolling entity may send the enrollment key, token, code or value to the server and the server may verify the enrolling entity based on the enrollment key.

A number of trusted (e.g., already or previously enrolled) entities, devices or users may be used, by an embodiment, to enroll a new user. For example, a first value described above may be sent to the new employee via a first employee who previously enrolled with a server or service, a second value may be sent to the new employee via a second employee and so on. In other cases, a set or values may be provided to a user using family members, e.g., a first value may be provided to a user via her husband, a second value may be provided by a child of the user and so on. Accordingly, to enroll a user, an embodiment may send to, or share with the user, a set of values or shares that may be used together to generate a key, code, token or value that may, in turn, be used for verifying and/or enrolling the user.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of securing a communication channel, the method comprising:

obtaining, by first and second devices, at least a first value, wherein the at least first value is obtained at least at the first device over an at least one out-of-band channel;

randomly selecting at least a second value, by one of the first device and the second device, and providing the at least second value to the other device over an at least one in-band channel;

independently, by the first and second devices, applying a first function to the at least first and at least second values;

using, by the first and second devices, a result of the first function to secure and authenticate a first communication channel between the first and second devices, obtaining, by the second and a third devices, at least a third value, wherein the at least third value is obtained at least at the second device over at least a second channel, wherein the at least second channel includes the first communication channel;

randomly selecting at least a fourth value, by one of the second device and the third device, and providing the at least fourth value to the other of the second or third device over at least a third channel;

independently, by the second and third devices, applying a second function to the at least third and at least fourth values; and using, by the second and third devices, a result of the second function to secure and authenticate a fourth communication channel between the first and third devices.

2. The method of claim 1, comprising:
generating a fifth value based on the at least first and at least second values;
using the fifth value to define an encryption key; and
using the encryption key to encrypt data communicated over the first communication channel.

3. The method of claim 1, comprising authenticating the second device, by the first device based on determination that the second device possesses the at least first and at least second values.

4. The method of claim 1, wherein obtaining the at least first value by the first and second devices includes selecting the at least first value, by the second device, and providing the at least first value to the first device.

5. The method of claim 1, comprising encrypting the at least first and at least second values.

6. The method of claim 1, wherein:
the at least first value includes a first pair of input and output values of a polynomial and the at least second value includes a second pair of input and output values of the polynomial and wherein the method includes:
using the first and second pairs to identify the polynomial; and
generating a fifth value based on a function applied to at least one coefficient of the polynomial.

7. The method of claim 1, comprising:
randomly selecting a degree K of the polynomial;
randomly generating a set of at least K+1 pairs of input and output values of the polynomial, wherein the at least first value includes at least a portion of the pairs and the at least second value includes remaining pairs, such that no single entity on a network obtains more than K+1 pairs included in the set of at least K+1 pairs;
using the at least K+1 pairs to reconstruct the polynomial; and
after constructing the polynomial from the at least K+1 pairs, applying a function to one of: the first and last coefficients of the polynomial and using a result of the function to secure and authenticate the communication channel between the first and second devices.

8. The method of claim 1, comprising:
independently using the at least first and at least second values, by the first and second devices, to define at least a fifth value; and
using the at least fifth value to secure and authenticate a communication channel between the first and second devices.

9. The method of claim 1, wherein the at least one out-of-band channel comprises a line of sight between the first and second devices.

10. The method of claim 1, wherein:
the at least third value includes a first pair of input and output values of a polynomial and the at least fourth value includes a second pair of input and output values of the polynomial and wherein the method includes:
using the first and second pairs to identify the polynomial; and
generating a fifth value based on a function applied to at least one coefficient of the polynomial.

11. The method of claim 1, wherein the first function and the second function are the same function.

12. A system comprising first, second and third computing devices configured to:
obtaining, by the first and second devices, at least a first value, wherein the at least first value is obtained at least at the first device over an at least one out-of-band channel;

randomly selecting at least a second value, by one of the first device and the second device, and providing the at least second value to the other device over an at least one in-band channel;

independently, by the first and second devices, applying a first function to the at least first and at least second values;

using, by the first and second devices, a result of the first function to secure and authenticate a first communication channel between the first and second devices, obtaining, by the second and a third devices, at least a third value, wherein the at least third value is obtained at least at the second device over at least a second channel, wherein the at least second channel includes the first communication channel;

randomly selecting at least a fourth value, by one of the second device and the third device, and providing the at least fourth value to the other of the second or third device over at least a third channel;

independently, by the second and third devices, applying a second function to the at least third and at least fourth values; and using, by the second and third devices, a result of the second function to secure and authenticate a fourth communication channel between the first and third devices.

13. The system of claim 12, wherein the computing devices are configured to:
generating a fifth value based on the at least first and at least second values;
using the fifth value to define an encryption key; and
using the encryption key to encrypt data communicated over the communication channel.

14. The system of claim 12, wherein the first computing device is configured to authenticate the second device based on determination that the second device possesses the at least first and at least second values.

15. The system of claim 12, wherein obtaining the at least first value by the first and second devices includes selecting the at least first value, by the second device, and providing the at least first value to the first device.

16. The system of claim 12, wherein the at least first and at least second values are encrypted.

17. The system of claim 12, wherein:
the at least first value includes a first pair of input and output values of a polynomial and the at least second value includes a second pair of input and output values of the polynomial and wherein the first computing device is configured to:
use the first and second pairs to identify the polynomial; and
generate a fifth value based on a coefficient of the polynomial.

18. The system of claim 12, wherein the computing devices are configured to:
randomly select a degree K of the polynomial;
randomly generate a set of at least K+1 pairs of input and output values of the polynomial, wherein the first value includes at least a portion of the pairs and the second value includes remaining pairs, such that no single entity on a network obtains more than K+1 pairs included in the set of at least K+1 pairs;
using the at least K+1 pairs to reconstruct the polynomial; and
after constructing the polynomial from the at least K+1 pairs, securing the communication channel between the first and second devices base on a function of at least one of the first and last coefficients of the polynomial.

19. The system of claim 12, wherein the at least one out-of-band channel comprises a line of sight between the first and second devices.

20. The system of claim 12, wherein the first function and the second function are the same function.

\* \* \* \* \*